March 26, 1963 E. S. GRIMES 3,083,337
VESTIGIAL SIDEBAND TRANSMISSION
Filed Sept. 25, 1959 8 Sheets-Sheet 1
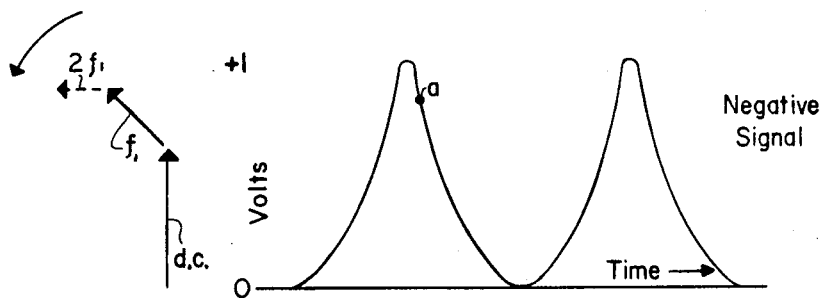
FIG. 1(a) Photo-Tube Output Wave
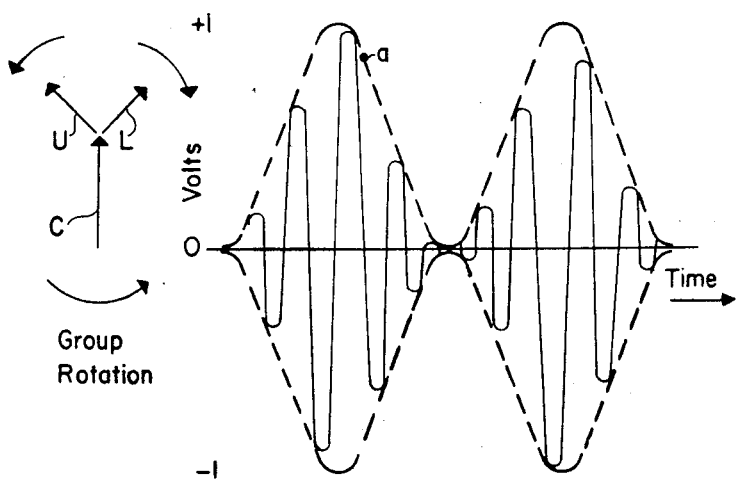
FIG. 1(b) Double Side Band Wave
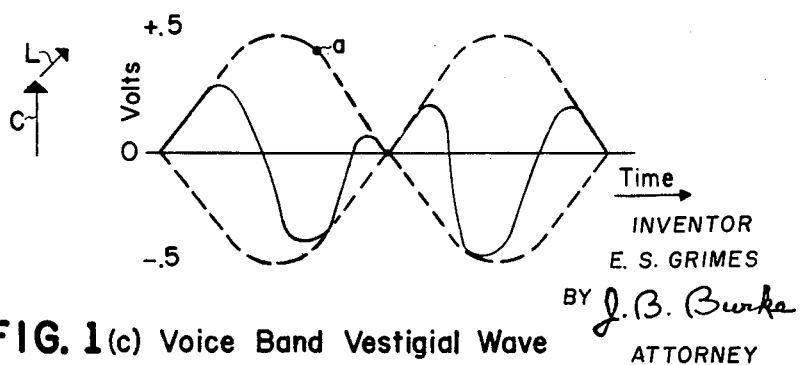
FIG. 1(c) Voice Band Vestigial Wave
INVENTOR
E. S. GRIMES
BY J. B. Burke
ATTORNEY

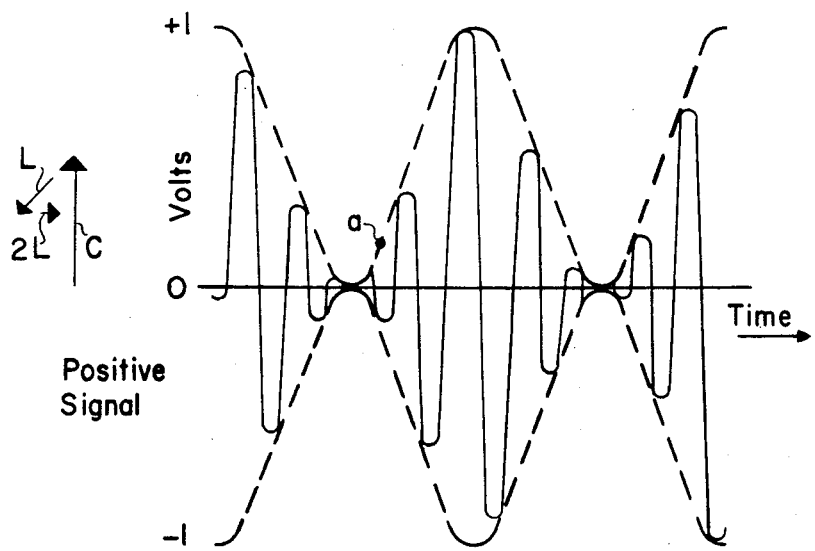
FIG. 1(d) Receiving Terminal 2nd Vestigial Wave
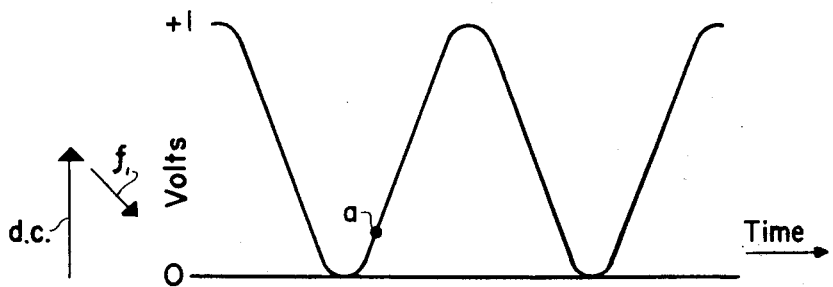
FIG. 1(e) Recording Stylus Wave

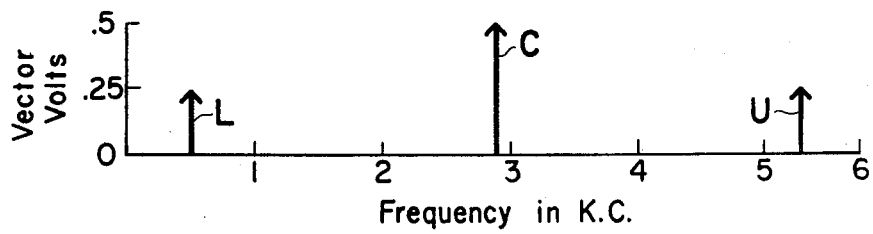
FIG. 2(a)   Double Side Band Vectors
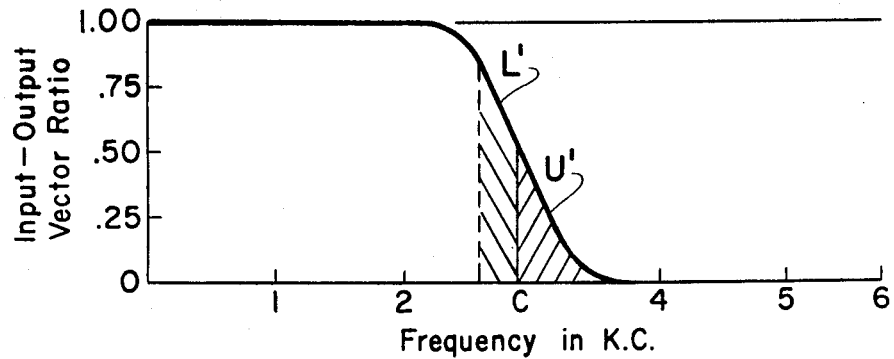
FIG. 2(b)   Vestigial Network Characteristics
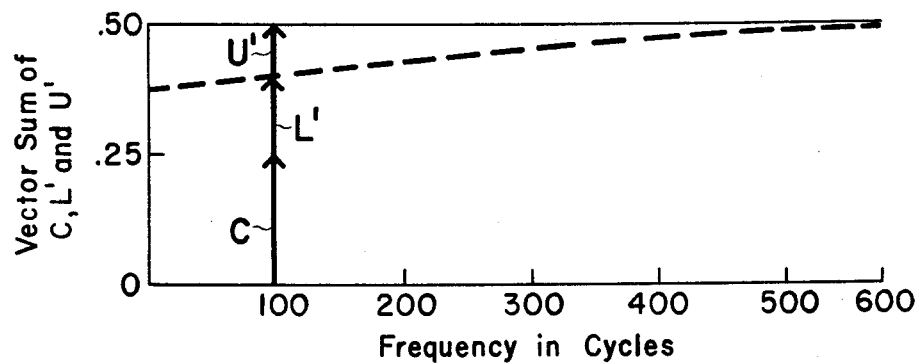
FIG. 2(c)   Detected Envelope Characteristics

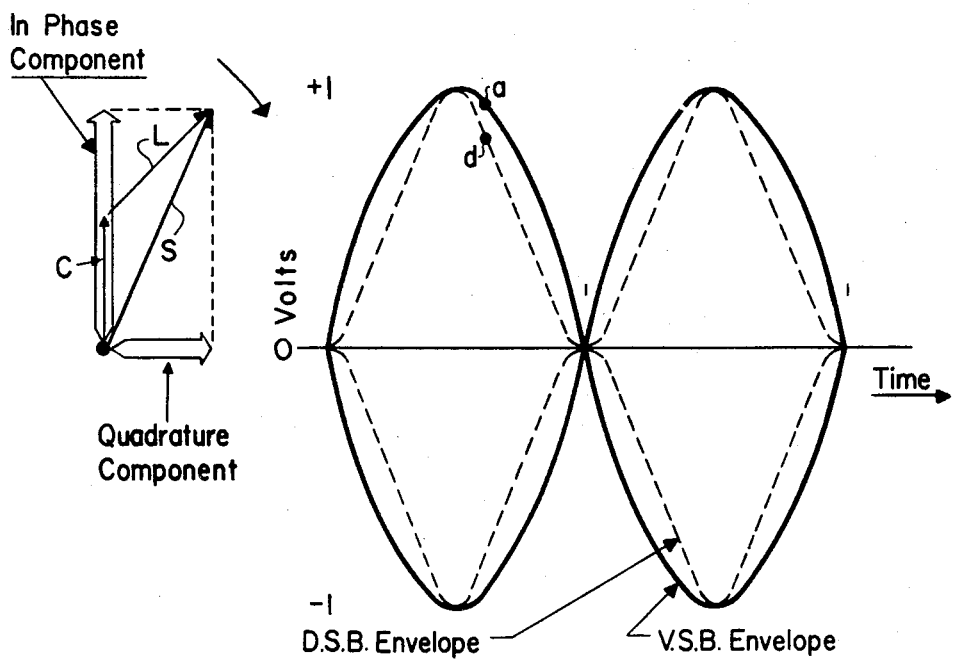
FIG. 3(a)   Vestigial Envelope
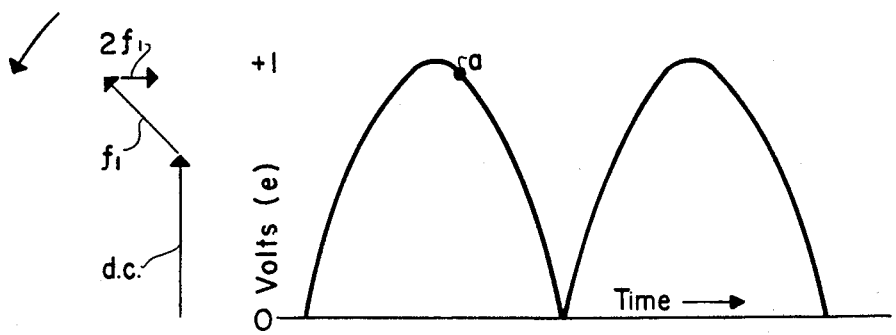
FIG. 3(b)   Detected Vestigial Envelope
$$e = \frac{2}{\pi} + \frac{4}{\pi}\left[\frac{1}{3}\cos(\omega t) - \frac{1}{15}\cos 2(\omega t) + \frac{1}{35}\cos 3(\omega t)\right]$$
$\quad\;\;$ d.c. $\qquad\qquad\quad f_1 \qquad\quad\; 2f_1 \qquad\quad\; 3f_1$
FIG. 3(c)   Detected Envelope Frequency Components

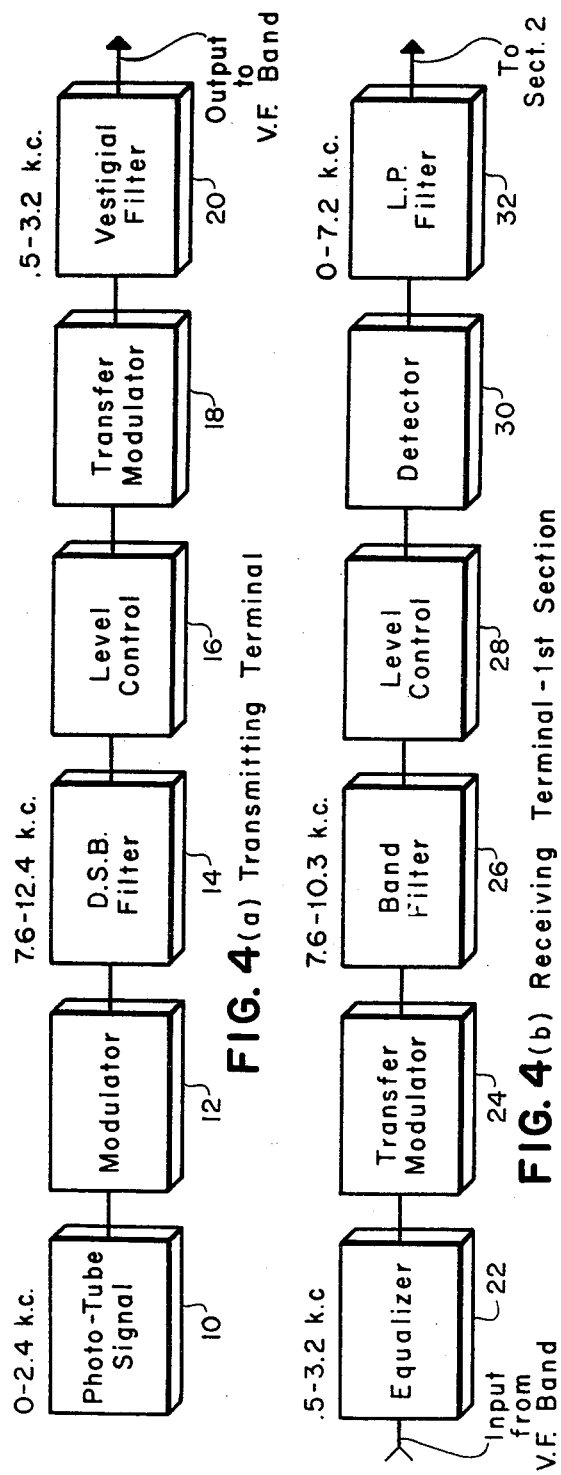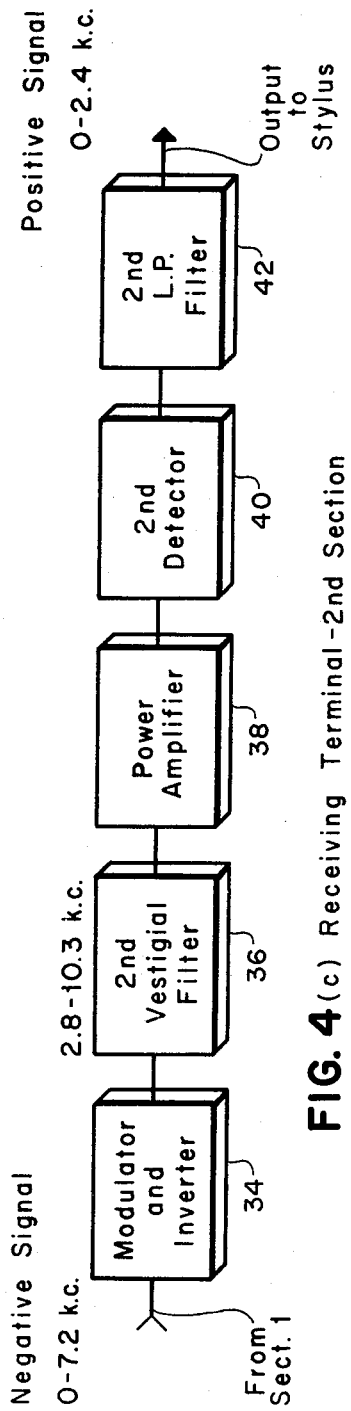

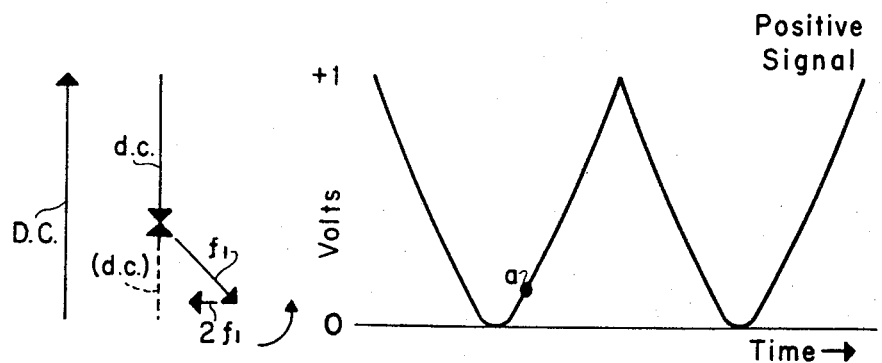
FIG. 5(a) Inverted Detected Wave
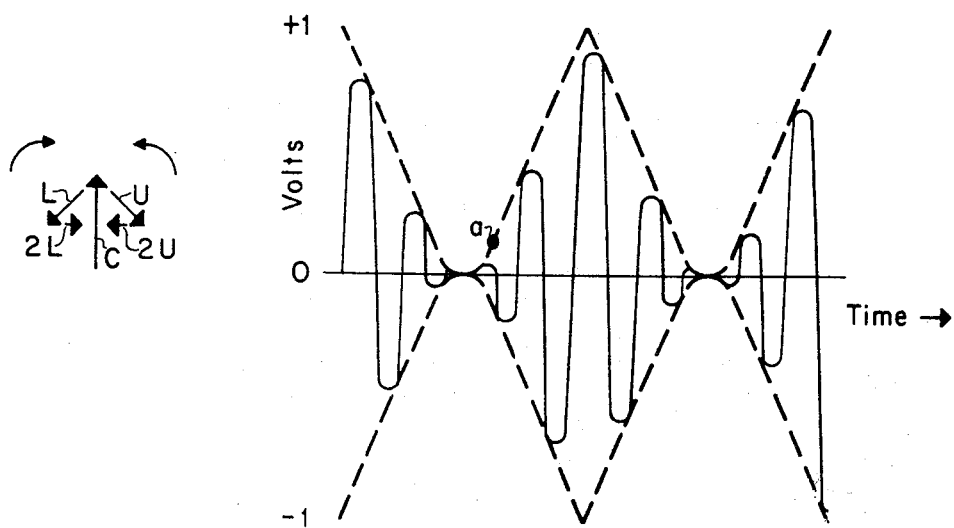
FIG. 5(b) Double Side Band Wave Generator By Inverted Detected Wave

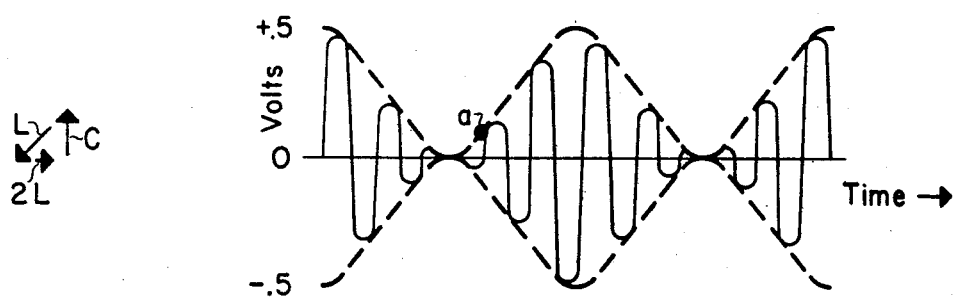
FIG.5(c) 2nd Vestigial Side Band Wave
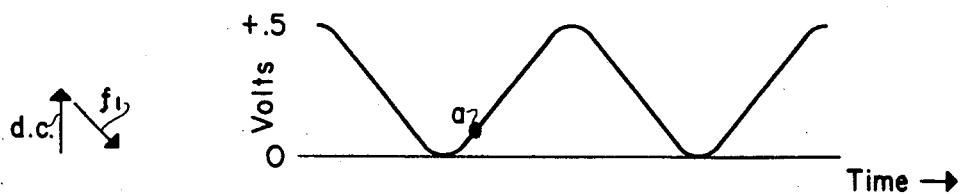
FIG.5(d) Detected Envelope of 2nd Vestigial Side Band Wave March 26, 1963   E. S. GRIMES   3,083,337
VESTIGIAL SIDEBAND TRANSMISSION
Filed Sept. 25, 1959   8 Sheets-Sheet 8
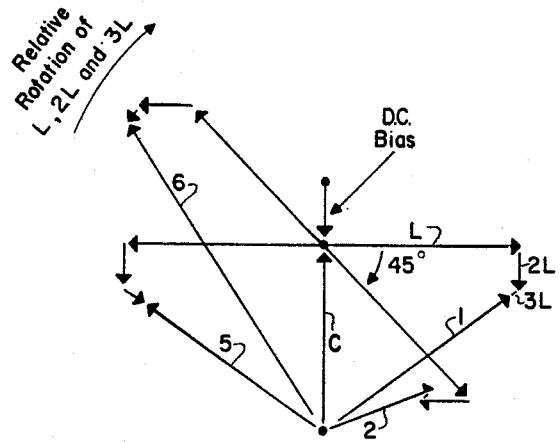
FIG. 6(a)   Vector Diagram
of C with D.C. Bias and Inverted
L, 2L and 3L
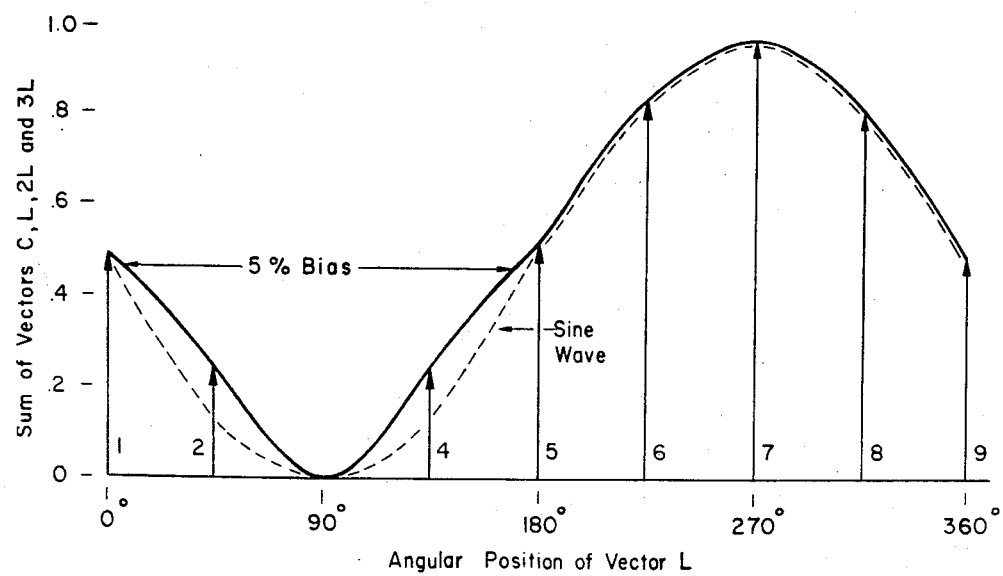
FIG. 6(b)   Envelope Contour Generated by
Carrier and Inverted
Lower Side Band with Harmonics United States Patent Office 3,083,337
Patented Mar. 26, 1963

3,083,337
VESTIGIAL SIDEBAND TRANSMISSION
Edgar S. Grimes, Ridgewood, N.J., assignor to The Western Union Telegraph Company, New York, N.Y., a corporation of New York
Filed Sept. 25, 1959, Ser. No. 842,301
5 Claims. (Cl. 325—65)

This invention relates to the art of signal transmission and more particularly concerns a vestigial sideband carrier current system of transmission.

The system is applicable for transmission of audio frequency signals such as facsimile, voice and telegraph. It is also applicable to television signals, data signals, etc.

It has been known heretofore that either of the two sidebands created by amplitude modulation of a carrier wave contains the same information; hence if one sideband is eliminated, less signal bandwidth is required for transmission of the intelligence. Many communications systems, particularly intercity facsimile communications systems take advantage of this phenomenon. Because of various practical considerations and design difficulties, a portion of the unwanted sideband remains in the signals transmitted. Nevertheless because of the economy effected in bandwidth, the vestigial sideband transmission of signals is preferred.

The present invention has as an object provision of a vestigial sideband correction circuit or system which is capable of operation with very low distortion at 100 percent modulation.

A further object is provision of a means for modifying the signal vectors at a transmitting terminal before the signals are sent over a voiceband, and provision of further means for restoring the original signal vectors before applying the signal wave to a use device such as a recording stylus.

A further object is to provide means for transmitting signals in which all signal envelope shapes from the input at the transmitter to the output of the receiver are directly related to the characteristics of a group of vectors under the envelope.

Another object is to provide a vestigial sideband signal transmission system in which certain causes of distortion to a received signal envelope are corrected.

Another object is to provide a vestigial sideband signal transmission system in which envelope distortion created by the quadrature component vector is substantially eliminated, while substantially 100 percent modulation of the carrier is maintained.

Other and further objects and advantages of the invention will become apparent from the following detailed description taken together with the drawing, wherein:

FIGS. 1(a) through 1(e) illustrate relations among various signal waveshapes and their vector components, at different circuit locations in the system embodying the invention;

FIGS. 2(a) through 2(c) illustrate signal vector characteristics involved in generation of a vestigial signal in the system;

FIGS. 3(a) through 3(c) illustrate frequency components of a vestigial signal envelope before and after detection;

FIG. 4 is a block diagram of components employed at transmitter and receiver terminals of a system according to the invention;

FIGS. 5(a) through 5(d) illustrate waveshapes and vector groups involved in quadrature distortion correction in the system;

FIG. 6(a) illustrates in detail a vector diagram of the wave envelope of FIG. 5(c); and FIG. 6(b) shows a single sideband envelope in which quadrature component distortion has been substantially corrected.

The vestigial sideband carrier current method of transmission has been applied to many types of signals, such as television, facsimile and business data. The fact that facsimile signals are sent over voicebands, that vestigial facsimile signals require less bandwidth than double sideband signals, and that the vestigial method produces signal distortion known as the quadrature component is familiar to most communications people. Not so familiar, however, are the techniques for modifying the signal vector group by network components, thereby overcoming at the sending and receiving terminals the limitations of an intercity voiceband circuit as a transmission medium for vestigial facsimile signals.

Several variations of the vestigial method of transmitting facsimile signals are in daily operation at reduced speeds and with some quadrature distortion. This invention presents a type of vestigial sideband correction circuit which has been developed that operates at near maximum speed and with low distortion at 100 percent modulation. The voiceband has an approximate amplitude versus frequency range from 300–3300 cycles per second thereby restricting the carrier frequency to the neighborhood of 2900 cycles per second and the signal speed to a maximum around 2400 cycles per second when the circuit delay distortion is corrected. This specification gives a general description of the steps or stages required to modify the signal vectors at the transmitting terminal before the signals are sent over a voiceband, and the stages required at the receiving terminal to restore the signal vectors before applying the signal wave to the recording stylus. By the proper processing of the signal vector group it is possible to obtain maximum speed (2400 cycles per second) with minimum overall distortion from an intercity circuit, since all signal envelope shapes from phototube to stylus are directly related to the characteristics of the group of vectors under the envelope. There are seven possible causes of distortion to the received signal envelope but they are controllable by the design of the receiving terminal equipment with the exception of bandwidth and noise.

The vector group characteristics are similar to the characteristics of an individual vector such as the amplitude of voltage or current, the frequency and the phase. In a group of vectors the envelope of the group may be modified by (1) adding a vector to the group or subtracting a vector from the group; (2) changing the relative amplitude of the vectors to each other; (3) altering the frequency ratio of the vectors to each other; (4) changing the relative phase of the vectors to each other. These four characteristic factors of the vector group are modified and controlled by the normal terminal circuit components, such as modulators, filters, detectors and equalizers. The graphic relationship between the vector group in the frequency domain and the carrier current envelope in the time domain is shown on FIG. 1 for the principal signal forms at different over-all circuit locations such as:

(a) *Phototube output wave.*—The generation of a negative signal by a scanning aperture and a phototube.

(b) *Double sideband wave at sending terminals.*—The generation of a double sideband envelope on a carrier several times higher in frequency than the signal.

(c) *Vestigial sideband waves on voiceband circuit.*—The transfer of the envelope to a carrier only slightly higher in frequency than the signal and the elimination of one sideband.

(d) *Second vestigial wave at receiving terminal.*—The transfer of the envelope back to a high-frequency carrier with the envelope inverted and the quadrature component neutralized.

(e) *Recording stylus wave.*—The detected high-frequency envelope giving a positive signal wave required for recording.

The direct signal waves FIG. 1 (a) and FIG. 1 (e) are the instantaneous sum of the vector group with time but the envelope waves FIGS. 1(b), 1(c) and 1(d) are the loci of the peaks of the modulated carrier cycles and represent idealized signal waves. The phototube output wave is the negative of the copy scanned and generates three vectors as shown in FIG. 1(a): a fundamental frequency $f_1$, a second harmonic $2f_1$, and a D.C. component. Vectors $f_1$ and $2f_1$ rotate counterclockwise and the indicated relative positions of the vectors to each other occur at approximately the instant of time $a$ on the waveshape. In FIG. 1(b) is shown the effect of a 10,000 cycles per second carrier C; modulated by the fundamental frequency $f_1$ resulting in a carrier envelope having an upper sideband vector U, and a lower sideband vector L.

This whole vector group C, L and U is rotating counterclockwise but the rotation of the vectors relative to each other is as shown; U is rotating counterclockwise relative to C but L is rotating clockwise relative to C. The vector $2f_1$ contained in the phototube signal has been eliminated by a filter and the D.C. vector has been replaced by a carrier vector C. In FIG. 1(c) only two vectors are present, C and L. Here the low-frequency 2900 cycles per second carrier voiceband vestigial wave has developed two envelope distortion factors, (1) a quadrature component due to suppressing the upper sideband U with a filter, and (2) and an amplitude pattern in the carrier due to the low ratio of carrier frequency to signal frequency. At the receiving terminal the wave at position (d) has been obtained by transferring the envelope at position (c) from the 2900 cycles per second carrier to a 10,000 cycles per second carrier, then detecting that envelope, inverting the wave and remodulating a second high-frequency vestigial envelope. By doing this the relative length of C to L is modified, a second order lower sideband 2L has been created, and a small third order lower sideband 3L, not shown, is also created. These changes in the vector group have operated to predistort the double sideband envelope, making it possible to neutralize the influence of the quadrature component introduced in the second vestigial process. In FIG.1(e) is shown the detected envelope of the second vestigial wave which indicates low bias distortion and low harmonic distortion.

*Generation of Vestigial Sideband Carrier Current Envelope*

A vestigial sideband carrier envelope is derived from a double sideband carrier in a direct manner by attenuating all but a vestige of one sideband with a filter having a specially designed attenuation region. A well-designed vestigial filter network reduces the carrier vector to 50 percent, and has an attenuation characteristic in the neighborhood of the carrier such that the detected envelope will have a constant amplitude as the modulation frequency is varied from a few cycles per second to 2400 cycles per second.

The relative magnitude and the frequency of the double sideband vectors under the envelope of a 2900 cycles per second modulated carrier are shown in FIG. 2(a) for a 2400 cycles per second signal. The sum of the vector group at their maximum amplitude is one unit. The carrier C is 0.5 units long, the lower sideband L is 0.25 units long, and the upper sideband U is 0.25 units long. By passing these vectors or frequencies through a vestigial network having the output-to-input characteristic of FIG. 2(b) the vector group is modified in number and relative magnitude. Vector L is unchanged, vector C is reduced 50 percent and vector U is completely suppressed. A test of the correct design of the output-to-input characteristic in the neighborhood of the carrier, such as the shaded area L' and U', is the frequency-amplitude characteristic of the detected output envelope.

FIG. 2(c) shows that as the carrier modulation is varied from some low frequency such as 10 cycles per second comprising essentially a double sideband system, to 300 cycles per second and beyond to 2400 cycles, per second, the maximum sum of the vector group remains constant at 0.5 units. In FIG. 2(c) the sum of 0.5 units is maintained while L' and U' vary in a complementary manner over the first 300 cycles per second to a constant L' above 300 cycles to 2400 cycles per second. However, although a constant amplitude has been obtained at all frequencies, the suppression of the upper sideband has modified the shape of the carrier envelope from a sine wave, introducing the type of distortion known as the quadrature component previously noted in FIG. 1(c).

The quadrature component distortion is an inherent part of a vestigial envelope and is the envelope obtained by the addition of any two sine waves of different frequency over a period of time equal to the period of the beat frequency between them. Mathematically the vector representing the quadrature component of distortion is determined by resolving vector S into two stationary vectors at right angles to each other, giving the quadrature component and the in-phase component as shown in FIG. 3(a). The in-phase vector is in phase with the carrier C and changes its magnitude relative to C but does not rotate relative to C. The quadrature component vector is at right angles to C and changes its magnitude relative to C but does not rotate relative to C. The magnitude of the vectors shown is approximately at instant of time $a$ on the solid line vestigial sideband envelope. The dotted line envelope is the shape of the original double sideband envelope and the difference between the two is attributable to the quadrature component. The detected vestigial envelope is shown in FIG. 3(b) and its vector group is related to the carrier vector group by the relationship that $f_1$ is equal to the difference in frequency between C and L, and the carrier vector C has been replaced by direct current vector D.C. The equation at FIG. 3(c) indicates that the detected envelope has introduced second and third harmonics and direct current bias distortion into the signal. The magnitude of these harmonics and the direct current bias distortion, as measured by the departure in length of the vector D.C. from 0.5 volts, can be greatly reduced in two ways: (1) by reducing the percent modulation to 50 percent, and (2) by inverting, remodulating and transmitting through a second vestigial network at the receiving terminal. Method (2) is discussed later.

If the facsimile signals were not required to be transmitted over substantial distances, the minimum electronic and network components necessary for making facsimile copy would reduce to a phototube excited from a scanning aperture with a light chopper, and an amplifier possessing adequate power to cause the recording stylus to mark on facsimile recording paper such as "Teledeltos" paper distributed by the Western Union Telegraph Company. However, the transmission of these same facsimile signals over an intercity voiceband at near maximum signal speed, 2400 cycles per second, requires certain electronic and network components for maximum performance. FIG. 4 is the block diagram of the electronic and network components at the transmitting and receiving terminals that are necessary to condition the signal vector group before and after transmission over an intercity voiceband. The transmitting terminal delivers to the voiceband a vestigial envelope signal that is level regulated, free of signal harmonics above 2400 cycles per second, free of the unbalanced signal energy that would lie within the voiceband range, and free of second and third order sidebands. At the transmitting terminal the voiceband vestigial envelope on 2900 cycles per second carrier is obtained indirectly from the phototube signal generator 10 by way of a double sideband signal on a 10,000 cycles per second carrier, as shown in FIG.

4(a). The phototube generates signals in the band from zero to 2400 cycles per second and this signal in modulator 12 modulates a 10,000 cycles per second carrier placing the signal band at 7.6–12.4 kc. (See FIG. 1(b).)

The double sideband filter 14 for this band eliminates unwanted signal harmonics and unwanted modulation products that are not possible to eliminate by direct modulation on 2900 cycles per second carrier. Variations in signal level art stabilized by the level control 16 and to some extent the percent modulation is also stabilized. The 10,000 cycles per second signal envelope, the locus of the peaks of the modulated carrier, is transferred to the 2900 cycles per second carrier by the transfer modulator 18 and the vestigial filter 20 eliminates the upper sideband before transmitting the facsimile signal to the voiceband. (See FIG. 1(c).) The sending terminal output signal is the negative of the copy scanned since the white areas produce maximum power output. Transmission over the line adds further distortion to the vector group by modifying their amplitude and phase.

In the first section of the receiving terminal, FIG. 4(b), four of the factors causing distortion in the received wave envelope are removed. The voiceband circuit equalizer 22 corrects the amplitude and phase distortion introduced by the intercity transmission channel and produces a replica of FIG. 1(c) at its output. The frequency ratio between the carrier and the signal is increased from 1.2 to 4.15 with the transfer modulator 24 that transfers the envelope from a 2900 cycles per second carrier to a 10,000 cycles per second carrier. Band press filter 26 removes the 2900 cycles per second carrier. This process removes the amplitude distortion pattern present in the envelope to give the familiar waveshape of FIG. 3(a), solid line. The circuit level corrector 28 stabilizes attenuation variations. The wave is rectified by detector 30 and the low frequency components are filtered by low pass filter 32. The output of the first section of the receiving terminal has the waveshape shown in FIG. 3(b) with the harmonic distortion and direct current bias distortion that is introduced indirectly by the quadrature component in the vestigial envelope.

Quadrature Component Neutralized

The process by which the signal distortion of FIG. 3(b) is neutralized in the receiving terminal second section, FIG. 4(c), is illustrated in the waveshapes and vector groups of FIGS. 5(a) to 5(d). The first step is to invert the detected wave and add an opposite sign direct-current vector D.C. to the vector group in an inverter and modulator circuit 34. The resulting vector group after inversion is shown in FIG. 5(a) as the new direct current vector shown dotted, the signal vector $f_1$ and the second harmonic vector $2f_1$. The resulting waveshape of FIG. 5(a) is applied to the vestigial modulator in circuit 34 at the second section of the receiving terminal, shown in FIG. 4(c), where it is remodulated on a 10,000 cycles per second carrier to produce the double sideband vector diagram and distorted carrier envelope shown in FIG. 5(b).

This predistorted envelope is now applied to the second vestigial filter 36 and will neutralize the envelope distortion created by the quadrature component vector in the second vestigial filter. The resulting vestigial envelope and vector group are shown on FIG. 5(c). This carrier envelope has the appearance of a double sideband shape but in its vector diagram the upper sideband U has been replaced by higher order sidebands 2L shown, and 3L not shown, and a shortened carrier vector C. The carrier envelope is amplified in amplifier 38 and then detected in detector 40. Detection of this envelope gives the low distortion positive signal wave of FIG. 5(d) with its vector group comprising vector $f_1$ and vector D.C. only. The output of the second section of the receiving terminal as derived from a second low pass filter 42 and applied to the recording stylus and is an inverted replica of the phototube signal of FIG. 1(a), minus aperture distortion.

It has thus been shown that similar envelope contours can be obtained from entirely different vector groups such as the double sideband envelope of FIG. 1(b) and the vestigial sideband envelope of FIG. 5(c). The envelope of FIG. 5(c) contains four vectors, three vectors shown and one vector 3L not shown, and this envelope is an inverted replica of FIG. 1(b) which contains only three vectors. The vector diagram of FIG. 5(c) is shown in detail in FIG. 6(a) and illustrates how the instantaneous sum of all the vectors neutralizes the influence of a single quadrature component vector. The sum vectors 1, 2, and so forth, are shown in FIG. 6(b) from 1 to 9 for various angular positions of vector L. The sum vectors are the instantaneous sum of the biased carrier vector C and the inverted vectors L, 2L and 3L at various angular positions of L giving the relatively distortion-free envelope contour of FIG. 6(b). Since the vector C, shown stationary, is in fact rotating counterclockwise, the sum vectors 1 to 9 develop either positive or negative lobes and an oscilloscope display would look like FIG. 5(c). The end result of reducing the vestigial envelope distortion is greater visual resolution in the facsimile copy for a given transmission bandwidth and 100-percent modulation.

I claim:
1. A signal transmission system comprising a generator of a band of low frequency signals, means for modulating a relatively high frequency carrier with said signals, means for transfer modulating the modulated carrier to produce low frequency single sideband signals, a receiving terminal for the single sideband signals, and a narrow band signal transmission line for the single sideband signals connected between the transmitting and receiving terminals, said receiving terminal including means for transfer modulating the receiving sideband signals to a relatively high frequency bandwidth, means for detecting the signals in the high frequency bandwidth to produce unipolar signals in a lower frequency bandwidth starting from zero frequency, means for inverting and remodulating the signals in the lower frequency bandwidth, a wide band vestigial sideband compensating filter for filtering the remodulated and inverted signals and suppressing quadrature distortion thereof, means for detecting the filtered signals to produce unipolar signals, and means for filtering the last named unipolar signals to recover the first named band of low frequency signals.

2. A signal transmission system comprising a transmitting terminal including a generator of voiceband signals, means for imposing on said voiceband signals a vestigial sideband signal envelope, said envelope being free of signal harmonics above said voiceband, of unbalanced signal energy within said voiceband and of second and third order sidebands, a receiving terminal for said signal envelope, and a narrow band signal transmission line for said signal envelope connected between the transmitting and receiving terminals, said receiving terminal including equalizing means for correcting amplitude and phase distortion of said signal envelope introduced by transmission of said envelope to the receiving terminal, transfer modulation means for modulating the distortion corrected envelope on a high frequency carrier to remove amplitude distortion originally present in said envelope, level control means for correcting and stabilizing attenuation variations in said envelope, means for detecting the level controlled envelope to produce a unipolar envelope, and means for removing harmonic and direct current bias distortion from the unipolar envelope to reproduce said voiceband signals substantially free of distortion.

3. A signal transmission system comprising a transmitting terminal including a generator of voiceband signals, means for imposing on said voiceband signals a vestigial sideband signal envelope, said envelope being free of signal harmonics above said voiceband, of unbalanced signal energy within said voiceband and of second and third order sidebands, a receiving terminal for said signal envelope, and a narrow band signal transmission line for said signal envelope connected between the transmitting and receiving terminals, said receiving terminal including equalizing means for correcting amplitude and phase distortion of said signal envelope introduced by transmission of said envelope to the receiving terminal, transfer modulation means for modulating the distortion corrected envelope on a high frequency carrier to remove any amplitude distortion originally present in said envelope, level control means for correcting and stabilizing attenuation variations in said envelope, means for detecting the level controlled envelope to produce a unipolar envelope, and means for removing harmonic and direct current bias distortion from the unipolar envelope to reproduce said voiceband signals substantially free of distortion, the last named means comprising inverting and modulating means for inverting polarity of said unipolar envelope and for modulating the inverted envelope on a high frequency carrier to produce a distorted carrier signal envelope with double sidebands, a vestigial sideband filter for neutralizing envelope distortion in the inverted envelope created by quadrature signal components and producing a double vestigial sideband wave envelope, and means for detecting the double vestigial sideband wave envelope to produce a signal wave substantially free of distortion.

4. A signal transmission system comprising a transmitting terminal including means for generating signals photoelectrically, said signals occupying a voiceband frequency range, means for modulating said voiceband signals on a high frequency carrier, double sideband filter means for filtering the modulated signals, level control means for regulating amplitudes of the filtered signals, transfer modulator means for modulating the level controlled signals upon a low frequency carrier, and a single sideband vestigial filter connected to the last named modulator means for producing a single sideband vestigial wave envelope, a receiving terminal, and a narrow band signal transmission line connecting the transmitting and receiving terminals, said receiving terminal comprising an equalizer for removing amplitude and phase distortion components introduced in said envelope during transmission of the same to said receiving terminal from the transmitting terminal, transfer modulation means for modulating said envelope on a high frequency carrier, band pass filter means for filtering the transferred envelope, level control means for stabilizing attenuation variations in the filtered envelope, means for detecting the level controlled envelope to obtain unipolar low frequency signals, low pass filter means for filtering the detected signals, and means for neutralizing signal distortion of the detected signals.

5. A signal transmission system comprising a transmitting terminal including means for generating signals occupying a voiceband frequency range, means for modulating said voiceband signals on a high frequency carrier, double sideband filter means for filtering the modulated signals, level control means for regulating amplitudes of the filtered signals, transfer modulator means for modulating the level controlled signals upon a low frequency carrier, and a single sideband vestigial filter connected to the last named modulator means for producing a single sideband vestigial wave envelope, a receiving terminal, and a narrow band signal transmission line connecting the transmitting and receiving terminals; said receiving terminal comprising an equalizer for removing amplitude and phase distortion components introduced in said envelope during transmission of the same to said receiving terminal from the transmitting terminal, means for modulating said envelope on a high frequency carrier, band pass filter means for filtering the transferred envelope, level control means for stabilizing attenuation variations in the filtered envelope, means for detecting the level controlled envelope to produce unipolar low frequency signals, low pass filter means for filtering the detected signals, and means for neutralizing signal distortion of the detected signals, the last named means comprising an inverter and modulator for inverting polarity of the filtered detected signals and for modulating the inverted signals upon a high frequency carrier to produce a distorted carrier envelope, a vestigial filter for neutralizing envelope distortion in the inverted envelope to produce a vestigial envelope free of quadrature distortion, a detector of said vestigial envelope, and a voiceband frequency filter for the detected vestigial envelope to produce substantially distortion free voiceband signals corresponding to the photoelectrically generated signals.

References Cited in the file of this patent
UNITED STATES PATENTS

| | | |
|---|---|---|
| 2,635,140 | Dome | Apr. 14, 1953 |
| 2,777,900 | Cowan | Jan. 15, 1957 |
| 2,835,739 | Ensink | May 20, 1958 |
| 2,849,537 | Eglin | Aug. 26, 1958 |
| 2,907,831 | De Jager et al. | Oct. 6, 1959 |